US010460239B2

(12) United States Patent
Petri et al.

(10) Patent No.: US 10,460,239 B2
(45) Date of Patent: Oct. 29, 2019

(54) GENERATION OF INFERRED QUESTIONS FOR A QUESTION ANSWERING SYSTEM

(71) Applicant: International Business Machines Corporation, Armonk, NY (US)

(72) Inventors: John E. Petri, St. Charles, MN (US); Michael D. Pfeifer, Rochester, MN (US); William C. Rapp, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 14/487,566

(22) Filed: Sep. 16, 2014

(65) Prior Publication Data

US 2016/0078354 A1 Mar. 17, 2016

(51) Int. Cl.
*G06N 5/02* (2006.01)
(52) U.S. Cl.
CPC ...................................... *G06N 5/02* (2013.01)
(58) Field of Classification Search
CPC ........... G06N 5/02; G06N 5/022; G06N 5/04; G06Q 10/10
See application file for complete search history.

(56) References Cited

U.S. PATENT DOCUMENTS

| 6,356,812 B1* | 3/2002 | Cragun ................... G01C 21/36 701/1 |
| 8,571,851 B1* | 10/2013 | Tickner ............... G06F 17/2785 704/1 |
| 8,577,671 B1 | 11/2013 | Barve et al. |
| 8,893,164 B1* | 11/2014 | Teller ...................... G06F 3/013 725/12 |
| 2005/0080780 A1* | 4/2005 | Colledge ............. G06F 17/2795 707/999.004 |
| 2007/0136222 A1* | 6/2007 | Horvitz .................... G06N 5/04 706/45 |
| 2011/0077055 A1* | 3/2011 | Pakula .................. H04M 19/04 455/567 |
| 2011/0078192 A1 | 3/2011 | Murdock, IV |
| (Continued) | | |

OTHER PUBLICATIONS

Chu-Carroll, J. et al. (2012). Finding needles in the haystack: Search and candidate generation. IBM Journal of Research and Development, 56(3.4), 6-1. DOI: 10.1147/JRD.2012.2186682 (Year: 2012).*

(Continued)

*Primary Examiner* — Kamran Afshar
*Assistant Examiner* — Benjamin J Buss
(74) *Attorney, Agent, or Firm* — Michael Purdham

(57) ABSTRACT

A system and computer implemented method for generating a set of inferred questions for a question answering system is disclosed. The method may include determining, based on context data, a user state. The method may also include extracting characterization information for an object satisfying an attention criteria. The characterization information may be configured to include sensory data. The method may also include determining a relationship between the object and the user state based on the characterization information for the object and the context data of the user state. The method may also include generating, based on the relationship between the object and the user state, a set of inferred questions for a question answering system.

20 Claims, 5 Drawing Sheets

(56) References Cited

U.S. PATENT DOCUMENTS

| | | | | |
|---|---|---|---|---|
| 2011/0199202 | A1* | 8/2011 | De Mers | G06F 3/013 340/439 |
| 2012/0078895 | A1* | 3/2012 | Chu-Carroll | G06F 17/30637 707/728 |
| 2013/0007037 | A1* | 1/2013 | Azzam | G06F 17/30654 707/769 |
| 2013/0038437 | A1* | 2/2013 | Talati | B60K 35/00 340/438 |
| 2013/0246046 | A1* | 9/2013 | Fan | G06F 17/2785 704/9 |
| 2013/0300654 | A1* | 11/2013 | Seki | G06F 3/013 345/156 |
| 2014/0006319 | A1 | 1/2014 | Anand et al. | |
| 2014/0108309 | A1* | 4/2014 | Frank | G06N 99/005 706/12 |
| 2014/0114148 | A1* | 4/2014 | Shepherd | A61B 5/168 600/301 |
| 2014/0136187 | A1* | 5/2014 | Wolverton | G06F 17/30654 704/9 |
| 2014/0176749 | A1* | 6/2014 | Horowitz | G06F 16/58 348/222.1 |
| 2014/0176813 | A1* | 6/2014 | Conness | G06K 9/00604 348/738 |
| 2014/0195221 | A1* | 7/2014 | Frank | G06N 5/04 704/9 |
| 2014/0258270 | A1* | 9/2014 | Reese | G06F 17/30867 707/722 |
| 2014/0344271 | A1* | 11/2014 | Bartram | G06F 16/285 707/737 |
| 2015/0039536 | A1* | 2/2015 | Cook | G06N 5/02 706/11 |
| 2015/0127340 | A1* | 5/2015 | Epshteyn | G10L 15/26 704/235 |
| 2015/0169544 | A1* | 6/2015 | Bufe, III | G06N 5/02 704/9 |
| 2015/0281299 | A1* | 10/2015 | Moustafa | H04L 65/60 709/219 |
| 2015/0302422 | A1* | 10/2015 | Bryson | G06K 9/00604 705/7.29 |
| 2016/0110524 | A1* | 4/2016 | Short | G06F 19/18 705/2 |

OTHER PUBLICATIONS

IBM, et al., "Selection and Manipulation with Information", IP.com Prior Art Database Technical Disclosure. Original Publication Date: Feb. 1, 1994. Original Disclosure Information: TBD v37 n2A Feb. 1994 p. 3-4. IP.com No. IPCOM000111005D. IP.com Electronic Publication Mar. 26, 2005.

IBM, "Method for securing stateful information and user provided data in a Digital Rights Management System", IP.com Prior Art Technical Disclosure. Publication Date Sep. 13, 2008. IP.com No. IPCOM000174548D. 4 pages.

Slawski, B. "Context Is King: Google Parameterless Searches", SEO by the Sea, Jul. 4, 2013. 17 pages. http://www.seobythesea.com/2013/07/google-parameterless-searches/ Last accessed Jun. 9, 2014 3:49 PM.

* cited by examiner

US 10,460,239 B2

GENERATION OF INFERRED QUESTIONS FOR A QUESTION ANSWERING SYSTEM

BACKGROUND

The present disclosure relates generally to computer systems, and more specifically, to generating inferred questions for a question answering system.

The amount of data and information available on the internet and other communication networks is growing rapidly. Question answering systems are one tool by which a user may find desired information. As the amount of available information increases, the need for question answering systems may also increase.

SUMMARY

Aspects of the present disclosure, in certain embodiments, are directed toward a system and method for generating a set of inferred questions for a question answering system. In certain embodiments, the method can include determining, based on context data, a user state. In certain embodiments, the method can include extracting characterization information for an object satisfying an attention criteria. The characterization information may include sensory data. In certain embodiments, the method can include determining a relationship between the object and the user state based on the characterization information for the object and the context data of the user state. In certain embodiments, the method can include generating, based on the relationship between the object and the user state, a set of inferred questions for a question answering system.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
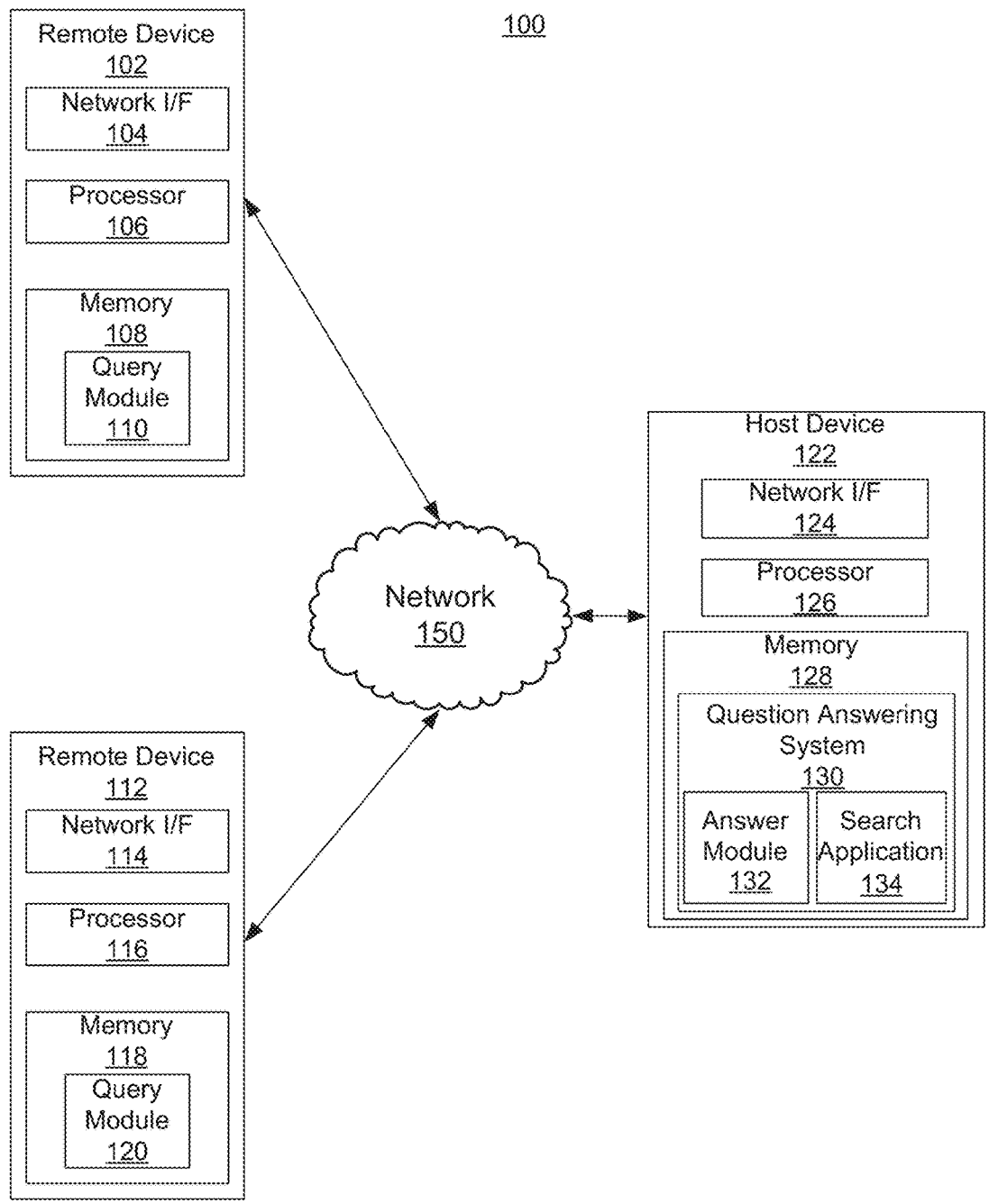
FIG. 1 is a diagrammatic illustration of an exemplary computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure, in certain embodiments, are directed toward a method for generating inferred questions for a deep question answering system. In certain embodiments, the method can include determining, based on context data, a user state. In certain embodiments, the method can include extracting characterization information for an object satisfying an attention criteria, wherein the characterization information includes sensory data. The method can also include determining a relationship between the object and the user state based on the characterization information for the object and a subset of the context data. The method can also include generating, based on the relationship between the object and the user state, a set of inferred questions for a question answering system.

As the amount of information available over computer networks, such as the Internet, rapidly increases, question answering systems have become an important tool in assisting users with the gathering, searching, and analysis of data. Aspects of the present disclosure, however, relate to the recognition that, at times, it may be desirable to gain answers to questions regarding real-world objects for which data is not readily available. Further, the questions that an individual has about an object may vary depending on the personal background or the physiological or emotional condition of the user. Accordingly, aspects of the present disclosure are directed toward generating inferred questions for a question answering system based both on a user state (e.g., physiological, emotional, personal background) as well as characterization information extracted from an object encountered by the user. Aspects of the present disclosure may provide benefits associated with increased search efficiency, knowledge acquisition, and awareness.

Aspects of the present disclosure, in certain embodiments, are directed toward a method for generating a set of inferred questions for a deep question answering system. More particular aspects relate to using context data for a user state and characterization information for an object as a basis for generating the set of inferred questions. The method and system may work on a number of devices and operating systems. Aspects of the present disclosure include determining, based on context data, a user state. The context data can be configured to include a location, a physical condition, an interest score, and a focus area. In certain embodiments, determining the user state can include collecting, by a user monitoring system using a set of sensors, environment data and biometric data for the user. The method can also include establishing, by analyzing the environment data, biometric data, and context data, the user state. In certain embodiments, the environment data can include weather data crowd density, noise level, and temperature, and the biometric data can include heart rate, eye movement, gait, posture, and vocal data.

Aspects of the present disclosure can include extracting characterization information for an object satisfying an attention criteria, wherein the characterization information includes sensory data. The sensory data can be configured to include visual data, textual data, and audio data. In certain embodiments, the attention criteria is defined by at least a portion of user profile data for the user and an attention threshold value calculated by an attention synthesis algorithm. In certain embodiments, the method may include identifying the object satisfying the attention criteria using a digital image processing algorithm configured to use one or more object recognition techniques including Scale-Invariant Feature Transform (SIFT).

Aspects of the present disclosure can include determining a relationship between the object and the user state based on the characterization information for the object and the subset of the context data. Determining the relationship between the object and the user state may include comparing the characterization information of the object with the subset of the context data. Determining the relationship may also include extracting a correlation between at least a portion of the characterization information and a subset of the context data.

Aspects of the present disclosure can include generating, based on the relationship between the object and the user state, a set of inferred questions for the question answering system. Generating the set of inferred questions can include identifying, by a natural language processing technique configured to analyze metadata for both the sensory data and the context data, a query subject based on the characterization information of the object. The method may also include deriving, using an ontology database of structured affiliations, a set of subject modifiers for the query subject. The method may also include formulating the set of inferred questions using the context data, the query subject, and the set of subject modifiers for the query subject.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 150 can be implemented by any number of any suitable communications media (e.g., wide area network (WAN), local area network (LAN), Internet, Intranet, etc.). Alternatively, remote devices 102, 112 and host device 122 may be local to each other, and communicate via any appropriate local communication medium (e.g., local area network (LAN), hardwire, wireless link, Intranet, etc.). In certain embodiments, the network 150 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests, queries, or statements) to host device 122 to retrieve search results. For example, the remote devices 102, 112 may include a query module 110 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., determining a user state, extracting characterization information for an object, determining a relationship between the object and the user state, generating a set of inferred questions), and may be implemented by any combination of any quantity of software and/or hardware modules or units.

Figure 2:
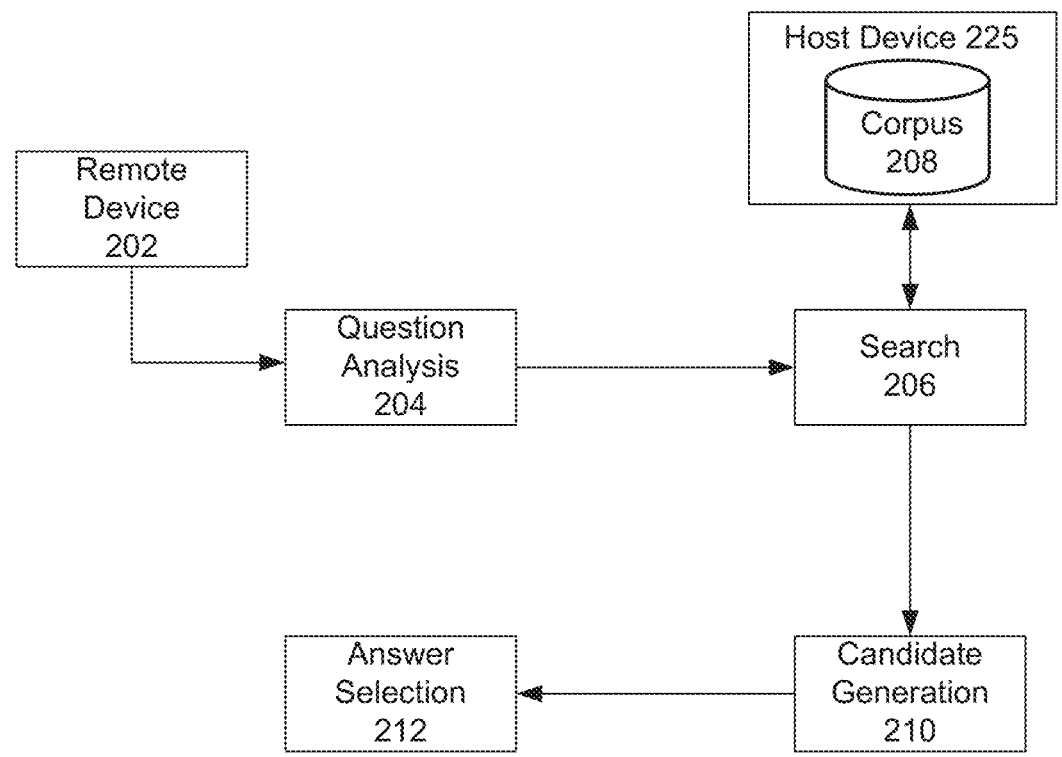
FIG. 2 is a system diagram depicting a high level logical architecture for a question answering system, according to embodiments.

FIG. 2 is a system diagram depicting a high level logical architecture for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The natural language question may be an interrogative sentence, declarative sentence, phrase, or word. The search component 206 can formulate queries from the output of the question analysis component 204 and may consult various resources such as the internet or one or more knowledge resources such as databases or corpora 208 to retrieve documents, passages, web pages, database rows, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212 which may produce a final ranked list of answers with associated confidence measure values.

The various components of the exemplary high level logical architecture for a QA system described above may be used to implement various aspects of the present disclosure. For example, the question analysis component 204 could, in certain embodiments, be used to process a natural language question and determine one or more credibility factors. Further, the search component 206 can, in certain embodiments, be used to perform a search of a corpus of information 208 for a set of search results that are related to an answer to an input question to the QA system. The candidate generation component 210 can be used to establish a relevance relationship between source information of a first search result of the set of search results and the one or more credibility factors of the results of the search component 206. Further, the answer selection component 212 can, in certain embodiments, be used to compute a credibility score for the first search result of the set of search results based on the relevance relationship between the at least one credibility factor and the source feature of the set of search results.

Figure 3:
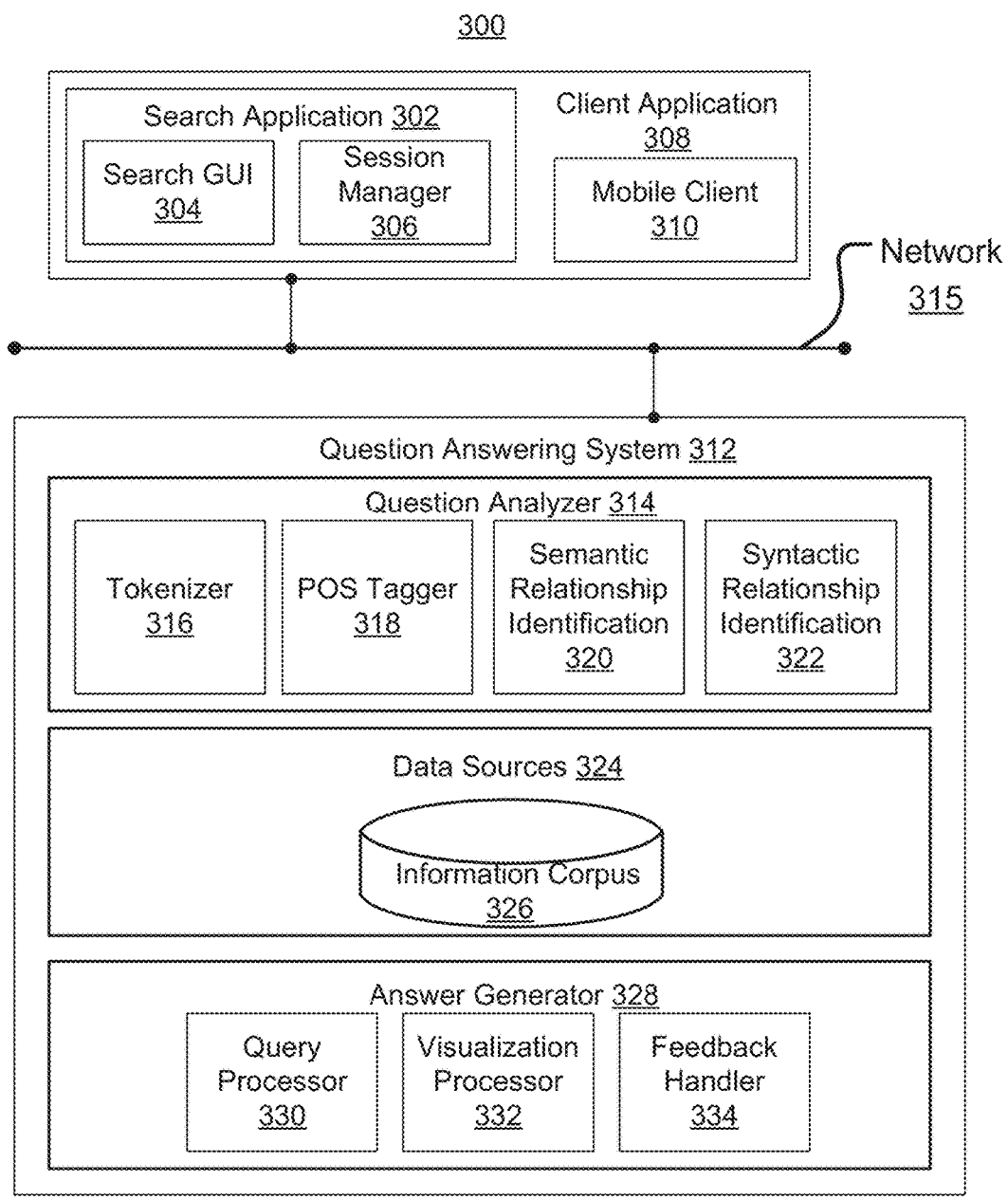
FIG. 3 is a block diagram illustrating a question answering system to generate answers to one or more input questions, according to embodiments.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information, or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile device, wearable device, or other type of device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server, or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315 (e.g. the Internet, intranet, or other public or private computer network). In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308 (e.g., posed questions by users). QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may encompass include, but are not limited to, a tokenizer 316, part-of-speech (POS) tagger 318, semantic relationship identification 320, and syntactic relationship identification 322. In certain embodiments, the question analyzer 314 can include using a natural language processing technique.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In certain embodiments, POS tagger 316 can tag or otherwise annotate tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized identifiers in questions posed by users. For example, the semantic relationship identification 320 may include identifying recognized identifiers such as location names, book titles, company names, academic disciplines, personal names, organizations, institutions, corporations, and other entities. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 314 may trigger computer modules 316-322. Question analyzer 314 can use functionality provided by computer modules 316-322 individually or in combination. Additionally, in certain embodiments, question analyzer 314 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database. In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332, and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to a receive set of inferred questions. The question analyzer 314 could, in certain embodiments, use a natural language processing technique to analyze the set of inferred questions, and identify the query subject and subject modifiers of the set of inferred questions. Further, the question answering system 312 could, in certain embodiments, perform a search of an information corpus 326 for a set of candidate answers for the set of inferred questions. The answer generator 328 can be used to formulate the set of candidate answers based on the results of the search performed by the question answering system 312. Further, the visualization processor 332 can, in certain embodiments, be used to compute a confidence score for a first candidate answer of the set of candidate answers based on metadata associated with the first candidate answer and metadata for both sensory data and context data. The visualization processor 332 can further determine and select a subset of the set of candidate answers to provide in a display area.

Figure 4:
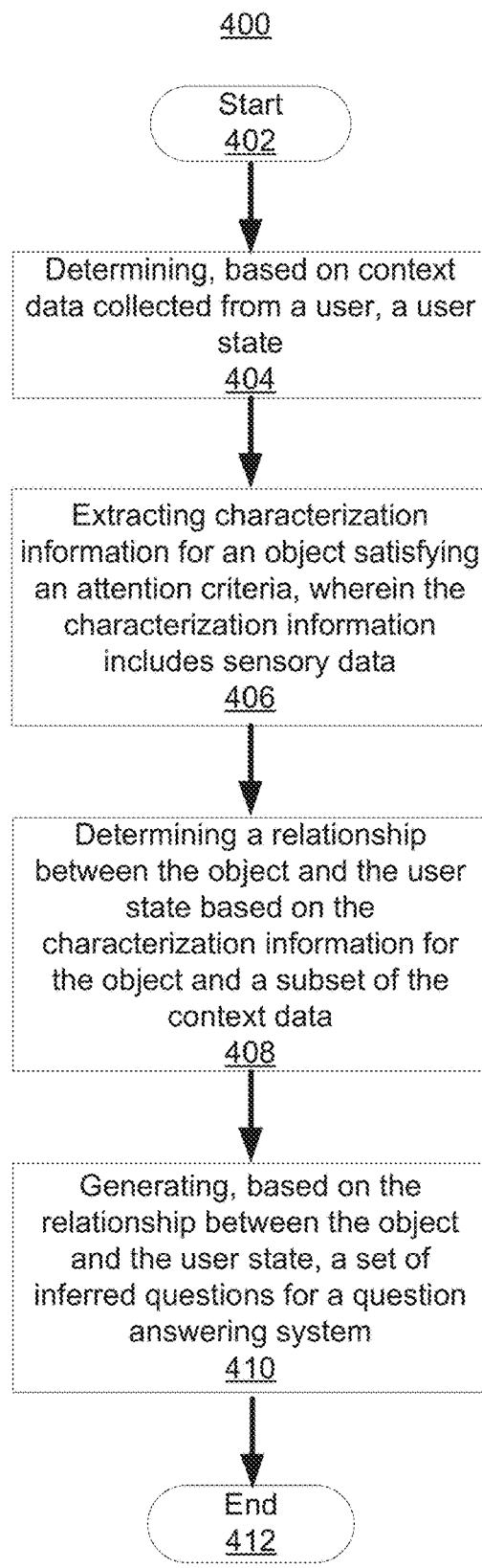
FIG. 4 is a flowchart illustrating a method for generating a set of inferred questions for a question answering system, according to embodiments.

FIG. 4 is a flowchart illustrating a method 400 for generating a set of inferred questions for a question answering system, consistent with embodiments of the present disclosure. The method 400 may begin at block 402. Consistent with various embodiments, the method can include a first determining block 404, an extracting block 406, a second determining block 408, and a generating block 410. The method 400 may end at block 412.

Consistent with various embodiments, at block 404 the method 400 can include determining, based at least partially on context data collected from a user, a user state. The user state may represent a present condition of a user with respect to a variety of physiological, emotional, environmental, and personal factors. The user state may be determined based on context data collected for the user. For example, the context data may include the geographical location and physical condition of the user, as well as particular interests, areas of knowledge or expertise, current environmental features, or biometric data. Other types of context data are also possible.

In certain embodiments, the context data may be collected by a user monitoring system using a set of sensors. The user monitoring system may include a central computing unit configured to collect and process data from the set of sensors. In certain embodiments, the user monitoring system may be a wearable computing device, or a mobile device such as a smart phone, tablet, or the like. In certain embodiments, the set of sensors may be configured to collect environment data and biometric data for the user. The set of sensors may include cameras, microphones, eye-tracking devices, heart rate monitors, accelerometers, brain function mapping apparatus, thermometers, barometers, and the like. As an example, the set of sensors may be configured to collect environment data such as weather data, crowd density, noise level, pressure, and temperature. Similarly, the set of sensors may be configured to collect biometric data such as heart rate, eye movement, gait, posture, and vocal data. In certain embodiments, the method 400 can include examining a user profile of the user to determine areas of interest, career experience, or other knowledgeable areas based on metadata associated with the user profile.

Consistent with various embodiments, the user monitoring system may use the collected context data to determine the user state. In certain embodiments, the user monitoring system may be configured to access a remote database hosting a set of predetermined user state profiles and corresponding characteristics. The method 400 may be configured to reference the database, compare the detected characteristics with the set of predetermined user state profiles, and determine the user state by matching the detected characteristics to a particular predetermined user state profile. Consider the following example. In certain embodiments, the set of sensors may determine an increase in respiration, heart rate, eye movement, perspiration, and brain activity (e.g., in the amygdala). The user monitoring system may also detect heavy rainfall, low barometric pressure, thunder, and lightning. In certain embodiments, the user monitoring system may evaluate a user profile for the user and determine that the user suffers from astraphobia. Accordingly, the user monitoring system may compare the detected characteristics with a set of predetermined user state profiles, and determine a user state such as "anxiety due to thunderstorm" for the user. Other methods of determining the user state are also possible.

Consistent with various embodiments, at block 406 the method 400 can include extracting characterization information for an object satisfying an attention criteria, wherein the characterization information includes sensory data. The characterization information can be data collected to identify, describe, or characterize an object. Accordingly, in certain embodiments, the characterization information may include sensory data. The sensory data may include visual data, textual data, or audio data. For example, the sensory data could include captured images or photographs, videos, documents, text, sound files, and the like. In certain embodiments, the method can include using a data extraction algorithm configured to analyze the sensory data and determine more specific information about the object. As an example, in certain embodiments, the object may be a book. The method 400 can include capturing sensory data (e.g., images) for the book, and may use the data extraction algorithm to process textual information associated with the book (e.g., text written on the cover or spine) to determine the title, author, and other information about the book.

In certain embodiments, the object may be a physical object (e.g., a tree, book, building), a non-physical object (e.g., sound file, data object, image) or another entity that can be identified by the set of sensors of the user monitoring system. In certain embodiments, an image of the object may be captured, and an image search may be performed with the image (e.g., through an internet search engine or other database) in order to identify the object. In certain embodiments of the present disclosure, the object may be recognized using one or more object recognition techniques. A variety of object recognition techniques are possible. For example, the method 400 may include using a digital image processing algorithm configured to use edge matching (e.g., Carny edge detection), greyscale matching, gradient matching, feature based methods, geometric hashing, Speeded Up Robust Features (SURF) techniques, and the like. In certain embodiments, the digital image processing algorithm may use Scale-Invariant Feature Transform (SIFT) to identify the image. Accordingly, the SIFT technique can use one or more "training images" to extract features descriptions of various objects, and match features of the object in a set of captured images with the feature descriptions of the objects in the training images to identify the object.

Consider the following example. The SIFT technique may use training images of books, cars, buildings, desks, and other objects to identify feature descriptions such as the dimensions, shape, light reflective properties (e.g., response to illumination changes), and other key points for each object of the training images. Accordingly, in embodiments of the present disclosure, the SIFT technique may identify an object by comparing a set of captured images to the training images, and determining that an object in the captured set of images matches the feature description of a known object.

In certain embodiments, the method 400 may include extracting characterization information for an object satisfying an attention criteria. The attention criteria may be a parameter used as a basis to gauge the interest of a user with regard to a particular object. For example, the attention criteria may be a numerical value indicating the level of interest a particular user is likely to have for a given object. In certain embodiments, the attention criteria may be defined by at least a portion of user profile data for a user. The user profile data may include detailed information regarding the interests, hobbies, and other curiosities of the user. A natural language processing technique may process the user profile data to determine the attention criteria. In certain embodiments, the user may complete an interest survey covering a wide range of subjects to ascertain the interests of the user. In certain embodiments, the attention criteria may be based on biometric data, such as the eye movement, brain activity, or gait of a user.

In certain embodiments, the method 400 may also include an attention threshold value calculated by an attention synthesis algorithm. The attention threshold value may be a minimum attention criteria value for an object. For example, the attention threshold value may be 84. Accordingly, an object with an attention criteria value of 81 may not satisfy the attention criteria, while an object with an attention criteria value of 89 may satisfy the attention criteria. As described herein, the attention threshold value may be calculated by an attention synthesis algorithm. The attention synthesis algorithm may be configured to process user profile data, interest survey data, and other forms of data to determine a variety of attention threshold values for different objects. In certain embodiments, the attention threshold value may be predetermined based on the nature of the object (e.g., books have an attention threshold value score of 73, motor vehicles have an attention threshold value of 54).

In certain embodiments, the attention threshold value may be based on a gaze duration. The gaze duration may indicate the length of time that a user looks at a particular location. For example, the attention threshold value may have a gaze duration threshold of 45 seconds. Accordingly, an object that is looked at by a user for greater than 45 seconds may satisfy the attention criteria. In certain embodiments, the gaze duration may be predetermined. In certain embodiments, the gaze duration may be configurable by a user.

Consistent with various embodiments, at block 408 the method 400 can include determining a relationship between the object and the user state based on the characterization information for the object and a subset of the context data. In certain embodiments, determining the relationship between the object and the user state may include comparing the characterization information of the object with a portion of the context data. As an example, the method 400 may compare captured images of an object satisfying an attention criteria with biometric data and focus area data collected by the set of sensors. The method may also include extracting a correlation between at least a portion of the characterization information and at least a portion of the context data of the user state. The correlation may be a similarity, correspondence, response, or other connection between the characterization information and the portion of the context data of the user state.

Consider the following example. A user may be walking through a neighborhood with a variety of houses featuring different styles of architecture. The user may have worked as an architect, and have an interest in Victorian-style architecture. A set of sensors may collect context data including environmental data, biometric data, and user profile data for the user. For example, the set of sensors may collect GPS coordinates, eye tracking data, heart rate, and interest area data for the user. As described herein, the method 400 can include determining that the user is in a residential neighborhood (e.g., from the GPS coordinates), the gaze of the user is focused on a particular house (e.g., from the eye tracking data), that heart rate is slightly elevated (e.g., from the heart rate data), and that the user is interested in Victorian architecture (e.g., from the user profile). The method can also include extracting characterization information from the Victorian-style house (e.g., through captured images and the like) including the color of the house, approximate size, age, architectural style, and other data. Accordingly, in certain embodiments, the method 400 can include identifying the house as Victorian-style based on the characterization information, and determine that the house satisfies the attention criteria based on the gaze of the user and the user's interest in Victorian architecture. In certain embodiments, the method 400 may then include comparing the characterization information for the Victorian-style house to the context data collected from the user, and determine a relationship between the user and the identified Victorian-style house. For example, the method 400 may determine from the elevated heart rate, focused gaze, and interest in Victorian-architecture, that the user is interested in the house. As described later herein, the method 400 may include generating inferred questions for a question answering system based on the relationship between the house and the user state.

Consistent with various embodiments, at block 410 the method 400 may include generating, based on the relationship between the object and the user state, a set of inferred questions for a question answering system. The set of inferred questions may be one or more queries that a user would be likely to ask based on the relationship between the object and the user state. In certain embodiments, generating the set of inferred questions can include using a natural language processing technique to identify a query subject based on the characterization information of the object. The query subject may be a word or phrase that describes the object based on the characterization information. In certain embodiments, the query subject may simply be the name of the object itself. For instance, referring to the previous example, the query subject may be identified as "Victorian house." Other query subjects are also possible.

In certain embodiments, the query subject may be determined by the natural language processing technique in response to analyzing metadata for both the sensory data and the context data. The natural language processing technique may be configured to recognize keywords, contextual information, and metadata tags associated with the sensory data and the context data. In certain embodiments, the natural language processing technique can be configured to analyze summary information, keywords, figure captions, and text descriptions included in the sensory data and the context data, and use syntactic and semantic elements present in this information to determine the query subject. The syntactic and semantic elements can include information such as word frequency, word meanings, text font, italics, hyperlinks, proper names, noun phrases, parts-of-speech, and the context of surrounding words. Other syntactic and semantic elements are also possible. Based on the analyzed metadata, contextual information, syntactic and semantic elements, and other data, the natural language processing technique can be configured to determine which query subject is appropriate for generating the set of inferred questions for the question answering system.

In response to identifying the query subject, the method 400 can include deriving a set of subject modifiers for the query subject. The set of subject modifiers may be words or phrases that describe the user state in relation to the query subject, or represent features of the query subject that could be elaborated on in greater detail. In certain embodiments, the method 400 may include referencing an ontology database of relations in order to derive the set of subject modifiers. The ontology database may provide a framework of predetermined relations between various query subjects and subject modifiers. As an example, consider that the method 400 has identified a book as an object satisfying an attention criteria of a user, and determined, as described herein, that the user is interested in the book. The method 400 may extract characterization information such as the name of the book and the author through captured images of the book, and identify a query subject based on the characterization information. For example, in certain embodiments the query subject may be identified as "A Study in Scarlet." Accordingly, the method 400 may access the ontology database, and use the framework of predetermined relations to determine subject modifiers for the book such as "synopsis," "series," "genre," "related media," "genre," and the like.

In response to deriving the set of subject modifiers for the query subject, the method 400 can include formulating the set of inferred questions using the context data, the query subject, and the set of subject modifiers for the query subject. In certain embodiments, the method 400 can include using a natural language processing algorithm configured to use the query subject and one or more subject modifiers to formulate a natural language question. Consider once again the previous example, wherein the query subject has been determined to be "A Study in Scarlet," and the subject modifiers have been derived as "synopsis," "series," "genre," "related media," and "genre." Accordingly, in certain embodiments, the natural language processing technique could generate questions such as "What is the synopsis for 'A Study in Scarlet'?", "Is there a movie for 'A Study in Scarlet'?", "What is the genre of 'A Study in Scarlet' ?", and "What are similar books to 'A Study in Scarlet'?" As described herein, the questions may then be submitted to a deep question answering system.

Consider the following example. A user may be traveling abroad in a foreign country, and be walking down a street lined with restaurants. The set of sensors may detect that the pace of the user has slowed, and he or she is looking at a sign in front of a particular restaurant displaying an advertisement for a miso soup special. In certain embodiments, the user may look at the advertisement for the miso soup special for a period of time longer than a designated gaze duration threshold, and "miso soup" may be identified as an object satisfying the attention criteria. The set of sensors may collect characterization data for the advertisement in the form of captured images, and analyze them to determine the name of the restaurant, the price of the miso soup special, and the like. The set of sensors may also collect context data for the user. In certain embodiments, the set of sensors may detect peristaltic sounds, and determine a user state of "hungry" for the user. Accordingly, the method 400 may include comparing the context data for the user with the characterization data for the restaurant. In certain embodiments, user profile data for the user may indicate that the user has a shellfish allergy. In certain embodiments, the user state may be updated to incorporate the shellfish allergy. For example, the updated user state could be "Hungry-Shellfish allergy." Consistent with various embodiments, the method 400 may include identifying "miso soup" as the query subject, and may access the ontology database to derive a set of query subject modifiers for "miso soup" that are related to the user state of "Hungry-Shellfish allergy." In certain embodiments, a set of query subject modifiers such as "safe," "reaction," and "contain." The method 400 may then include generating a set of inferred questions based on the query subject and the set of query subject modifiers, such as "Is miso soup safe for people with Shellfish allergies?", "What reaction do people with shellfish allergies have to miso soup?", and "Does miso contain shellfish?" As described herein, the set of inferred questions may be submitted to a question answering system such as the question answering system of FIG. 3.

Figure 5:
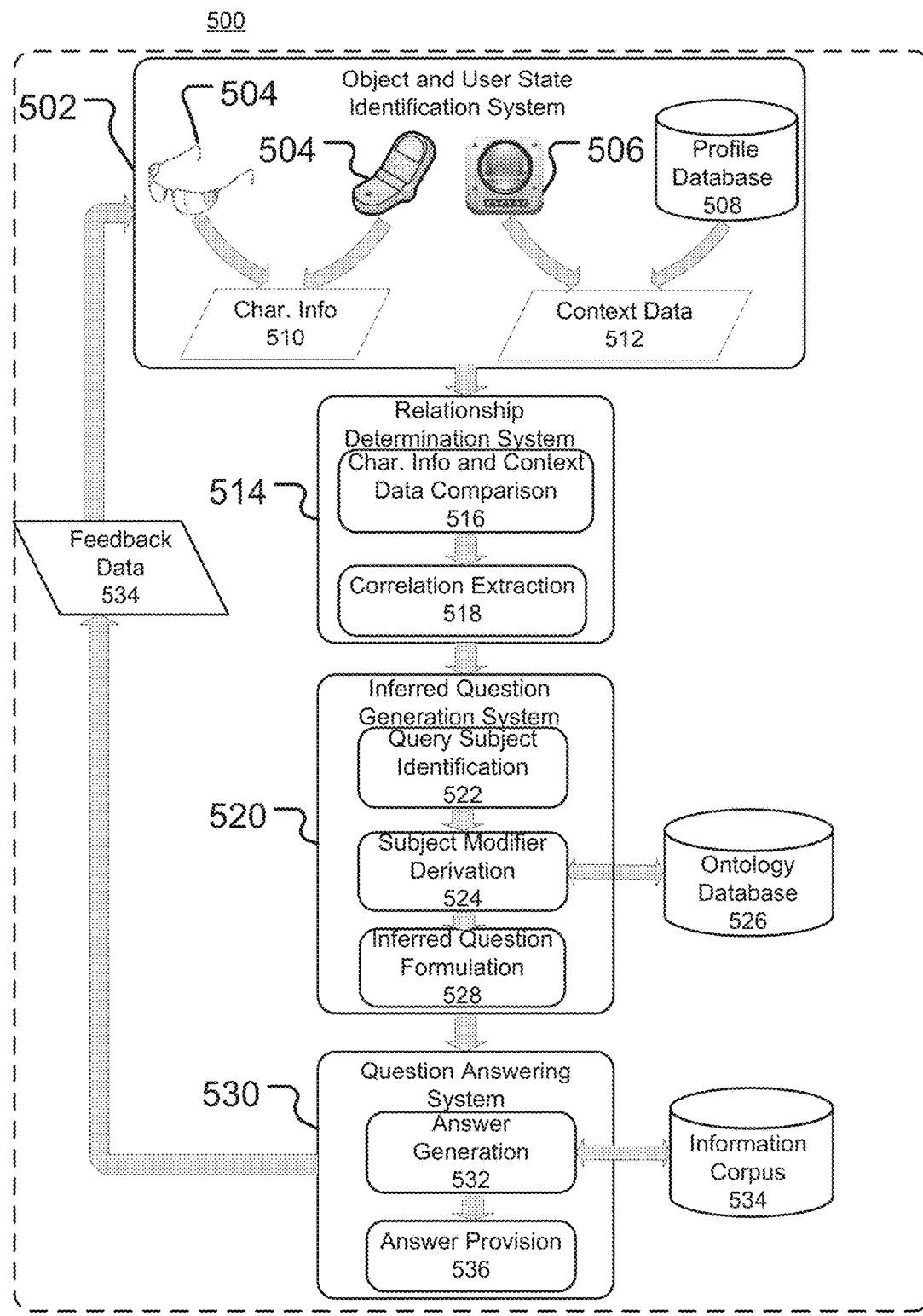
FIG. 5 is a diagram illustrating an example system architecture for testing a set of alternative computer environments for running a set of workloads, according to embodiments.

FIG. 5 is a diagram illustrating an example system architecture 500 for testing a set of alternative computer environments for running a set of workloads, consistent with embodiments of the present disclosure. Aspects of FIG. 5 are directed toward generating a set of inferred questions based on a relationship between a user state and an object, and submitting the set of inferred questions to a question answering system. The example system architecture 500 can include an object and user state identification system 502, a relationship determination system 514, an inferred question generation system 520, and a question answering system 530.

Consistent with various embodiments, the example system architecture 500 can include an object and user state identification system 502. The object and user state identification system 502 can include one or more personal devices 504 configured to collect characterization information for an object. The personal devices 504 may, for example, be smart phones, tablets, wearable devices (e.g., smart watches or smart glasses), or other types of computing devices. In certain embodiments, the personal devices may be equipped with a set of sensors (e.g., cameras, microphones) configured to collect characterization information 510 including visual data, textual data, or audio data for one or more objects. In certain embodiments, the object and user state identification system may also include a biometric data collection system 506. The biometric data collection system 506 may be configured to utilize a variety of sensors to collect physiological, emotional, and personal data for a user. For example, the biometric data collection system 506 may be configured to collect eye-tracking data, gait data, heart rate data, respiration data, and the like. Additionally, the object and user state identification system 502 may include a profile database 508. The profile database may host a set of user profiles containing information regarding the interests, hobbies, career and education history, and other data for users. Accordingly, the context data 512 may describe the user state for a user by analyzing data from a user profile of the profile database 508 and biometric data from the biometric data collection system 506.

The example system architecture 500 may also include a relationship determination system 514. The relationship determination system 514 may include a characterization information and context data comparison module 516, and a correlation extraction module 518. The characterization information and context data comparison module 514 may, in certain embodiments, be configured to compare the characterization information 510 and the context data 512 received from the object and user state identification system 502. The characterization information and context data comparison module 516 may look for similarities or links between the characterization information 510 for the object and the context data 512 for the user. As an example, the characterization information and context data comparison module 510 may identify from the context data 512 that the user is allergic to bee stings, and determine from the characterization information 510 that the user is nearby an unidentified insect with bee-like characteristics. Accordingly, the correlation extraction module 518 may be configured to extract a correlation between the characterization information 510 and the context data comparison 518. For example, the correlation extraction module 518 could determine that the user is in a potentially hazardous environment due to the bee-like insect and the user's past history of allergic reactions to bee stings.

In certain embodiments, the example system architecture 500 may include an inferred question generation system 520. The inferred question generation system may include a query subject identification module 522, a subject modifier derivation module 524, and an inferred question formulation module 528. The query subject identification module 522 can be configured to identify a query subject based on the characterization information 510. The query subject can be a word or phrase that describes the object based on the characterization information. In certain embodiments, the query subject may simply be the name of the object itself. In certain embodiments, the query subject may be a captured image of the object. For example, referring to the example above, the query subject may be an image of the bee-like insect. The subject modifier derivation module 524 may be configured to reference an ontology database 526 to determine a set of subject modifiers for the query subject. The ontology database may be hosted on a remote server accessible by the inferred question generation system 520 and provide a framework of predetermined relations between various query subjects and subject modifiers. The inferred question formulation module 528 may be configured to use the query subject and the derived subject modifiers to construct a set of inferred questions for a question answering system. In certain embodiments, constructing the set of inferred questions may include using a natural language processing algorithm to use semantic and syntactic elements of the subject modifiers and the query subject to generate a grammatically correct natural language question based on the context data 512 and the characterization information 510.

As shown in FIG. 5, in certain embodiments the example system architecture 500 may include a question answering system 530. The question answering system 530 may include an answer generation module 532 and an answer provision module 536. In certain embodiments, the question answering system 530 may correspond to the question answering system of FIG. 3. The answer generation module 532 may be configured to use a natural language processing technique to parse the set of inferred questions, and perform a search of an information corpus 534 to retrieve data to answer the set of inferred questions. The information corpus 534 may be a storage mechanism that houses documents, images, videos, data modules, and other content. Data stored in the information corpus 534 may be structured in a way to specifically address reporting and analytic requirements. In certain embodiments, the information corpus may be a relational database.

The answer provision module 536 may be configured to provide answers to the set of inferred questions. Examples of answers generated by the answer provision module 536 may include, but are not limited to, answers in the form of natural language sentences, reports, charts or other analytic representation, raw data, web pages, and the like. In certain embodiments, the answers may be provided to the user on a personal device, such as personal device 504. The answer provision module 536 may produce a list of answers corresponding to a question of the set of inferred questions. The user may rank each answer according to its relevance to the question. In certain embodiments, the feedback of users on generated answers may be used for future question answering sessions. For example, the question answering system 530 may generate feedback data 534 and transmit it to the object and user state identification system 502 (or, alternatively, another system of the example system architecture 500). The feedback data may be used to refine the characterization information 510 and context data 512 collected for sessions.

Consider the following example. A user walking down a street may see a large dog. The object and user state identification system 502 may gather context data 508 including eye movement data, heart rate data, gait data, weather data, perspiration data, and user profile data. The user profile data may indicate that the user was attacked by a dog as a child, and may be anxious around large dogs. Accordingly, the large dog may be identified as satisfying the attention criteria. Characterization information 510 may be collected for the large dog, such as images, size, coloration, and the like. In certain embodiments, the large dog may be identified as a German Shepherd.

The relationship determination system 514 may compare the characterization information 510 with the context data 512 to determine a relationship between the user and the German Shepherd. For example, the relationship determination system may determine that the user's gaze is fixated on the German Shepherd, the user is backing away from the German shepherd, and has an increased heart rate and perspiration level. Accordingly, the relationship determination system may determine a user state of "afraid" with respect to the German Shepherd. In certain embodiments, the relationship determination system 514 may confirm the user state with the user. For example, the relationship determination system 514 may ask one of a number of clarifying questions (via the personal device 504) to the user in order to confirm the user state, such as "Are you afraid of the dog?", or "Are you excited?" In certain embodiments, the user may respond to indicate that he/she is afraid of the dog.

Accordingly, the inferred question generation system 520 may identify "German Shepherd," as a query subject, and use ontology database 526 to identify subject modifiers for the query subject based on the user state of "afraid." For example, subject modifiers such as "aggressive," "attack," and "bite" may be determined for the query subject. In certain embodiments, the question formulation module 528 may generate a set of inferred natural language questions such as "Are German Shepherds aggressive?" and "Do German Shepherds bite?" for question answering system 530.

As described herein, the questions formulated by the question formulation module 528 may be submitted to question answering system 530. Question answering system 530 may query an information corpus (e.g., information corpus 534) to determine answers for the set of inferred questions. In certain embodiments, the answers to the set of inferred questions may be provided to the user via a personal device such as personal device 504.

As described herein, aspects of the present disclosure may provide benefits associated with increased search efficiency, knowledge acquisition, and environmental awareness.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for generating a set of inferred questions for a question answering system, the method comprising:

determining, by a user monitoring system and based on context data a user state, wherein determining the user state includes comparing the context data with one or more user state profiles;

identifying, by the user monitoring system, an object satisfying an attention criterion, wherein the attention criterion is defined by an attention threshold value calculated by an attention synthesis algorithm;

extracting, by the user monitoring system using a data extraction algorithm, characterization information for the object satisfying the attention criterion, wherein the characterization information is configured to include sensory data of the object, wherein the characterization information includes data collected to describe or characterize the object;

determining, by the user monitoring system and using the characterization information for the object and a subset of the context data, a relationship between the object and the user state;

generating, by the user monitoring system based on the relationship between the object and the user state, a set of inferred questions for the question answering system; and generating, using the question answering system, one or more answers for the set of inferred questions; and using, by the user monitoring system, feedback from the user on the one or more answers generated for the set of inferred questions in one or more subsequent question answering sessions to refine the characterization information and the context data.

2. The method of claim 1, wherein the context data is configured to include a location, a physical condition, an interest score, and a focus area, and the sensory data is configured to include visual data, textual data, and audio data.

3. The method of claim 2, wherein determining the user state includes:

collecting, by the user monitoring system using a set of sensors, environment data and biometric data for the user; and establishing, by analyzing the environment data and biometric data, the user state.

4. The method of claim 3, further comprising:

determining, by the user monitoring system, that the user state includes a gaze having a gaze duration greater than a gaze threshold;

collecting, by a mobile device, characterization information including visual data, textual data, and audio data from a first object, wherein the first object is a target of the gaze;

comparing the characterization information of the first object with the subset of the context data;

extracting a correlation between the characterization information of the first object and the focus area of the user state; and generating, based on the correlation between the characterization information of the first object and the focus area of the user state, a set of inferred questions for a question answering system.

5. The method of claim 4, wherein the mobile device is one or more selected from the group consisting of smart phones, tablets, smart watches, and wearable computing devices.

6. The method of claim 3, wherein the environment data includes at least one member of a group consisting of weather data, crowd density, noise level, and temperature; and the biometric data includes at least one member of a group consisting of heart rate data, eye movement data, gait data, posture data, and vocal data.

7. The method of claim 1, wherein the attention synthesis algorithm involves at least a portion of user profile data for the user.

8. The method of claim 1, wherein determining the relationship between the object and the user state includes:

comparing the characterization information of the object with the subset of the context data; and extracting a correlation between at least a portion of the characterization information and the subset of the context data.

9. The method of claim 1, wherein generating the set of inferred questions includes:

identifying, by a natural language processing technique configured to analyze metadata for both the sensory data and the context data, a query subject based on the characterization information of the object;

deriving, using an ontology database of structured affiliations, a set of subject modifiers for the query subject; and formulating the set of inferred questions using the context data, the query subject, and the set of subject modifiers for the query subject.

10. The method of claim 1, further comprising identifying the first object satisfying the attention criterion using a digital image processing algorithm configured to use one or more object recognition techniques including Scale-Invariant Feature Transform (SIFT).

11. A system for generating a set of inferred questions for a question answering system, the system comprising:

a set of sensors;

one or more processors; and a memory communicatively coupled to the one or more processors, wherein the memory comprises instructions which, when executed by the one or more processors, cause the one or more processors to perform a method comprising the steps of:

collecting, using the set of sensors, context data including environment data and biometric data for a user;

establishing, by analyzing the context data, a user state;

identifying, an object satisfying an attention criterion, wherein the attention criterion is defined by an attention threshold value calculated by an attention synthesis algorithm;

extracting, using a data extraction algorithm, characterization information for the object satisfying the attention criterion, wherein the characterization information is configured to include sensory data of the object, wherein the characterization information includes data collected to describe or characterize the object;

determining, a relationship between the object and the user state based on the characterization information for the object and a subset of the context data;

generating, based on the relationship between the object and the user state, a set of inferred questions for the question answering system; and generating, using the set of inferred questions and by the question answering system, a set of candidate answers from which one or more answers are selected; and using feedback from the user on the one or more answers selected for the set of inferred questions in one or more subsequent question answering sessions to refine the characterization information and the context data.

12. The system of claim 11, wherein the context data is configured to include a location, a physical condition, an interest score, and a focus area, and the sensory data is configured to include visual data, textual data, and audio data.

13. The system of claim 11, wherein the attention synthesis algorithm involves at least a portion of user profile data for the user.

14. The system of claim 11, wherein the one or more processors are further configured such that determining the relationship between the object and the user state further comprises:

comparing the characterization information of the object with the subset of the context data; and extracting a correlation between at least a portion of the characterization information and the subset of the context data.

15. The system of claim 11, wherein the one or more processors are further configured to perform the method further comprising:

identifying, using a natural language processing technique configured to analyze metadata for both the sensory data and the context data, a query subject based on the characterization information of the object;

deriving, using an ontology database of structured affiliations, a set of subject modifiers for the query subject; and formulating the set of inferred questions using the context data, the query subject, and the set of subject modifiers for the query subject.

16. The system of claim 11, wherein the environment data includes weather data, crowd density, noise level, and temperature, and the biometric data includes heart rate, eye movement, gait, posture, and vocal data.

17. A computer program product comprising a computer readable storage medium having a computer readable program stored therein, wherein the computer readable program, when executed on a first computing device, causes the first computing device to:

collect, using a set of sensors, context data including environment data and biometric data for a user;

establish, by analyzing the context data, a user state;

identify, an object satisfying an attention criterion, wherein the attention criterion is defined by an attention threshold value calculated by an attention synthesis algorithm;

extract, using a data extraction algorithm, characterization information for the object satisfying the attention criterion, wherein the characterization information is configured to include sensory data of the object, wherein the characterization information includes data collected to describe or characterize the object;

determine a relationship between the object and the user state based on the characterization information for the object and a subset of the context data;

identify, using a natural language processing technique configured to analyze metadata for both the sensory data and the context data, a query subject based on the characterization information of the object;

derive, using an ontology database of structured affiliations, a set of subject modifiers for the query subject; and formulate a set of inferred questions using the context data, the query subject and the set of subject modifiers for the query subject; and generate one or more answers for the set of inferred questions; and use feedback from the user on the one or more answers generated for the set of inferred questions in one or more subsequent question answering sessions to refine the characterization information and the context data.

18. The computer program product of claim 17, wherein the context data is configured to include a location, a physical condition, an interest score, and a focus area, and the sensory data is configured to include visual data, textual data, and audio data.

19. The computer program product of claim 18, wherein the computer readable program is further configured to cause the first computing device to:

determine, by the user monitoring system, that the user state includes a gaze having a gaze duration greater than a gaze threshold;

collect, by a mobile device, characterization information including visual data, textual data, and audio data from a first physical object, wherein the first physical object is a target of the gaze;

compare the characterization information of the first physical object with a subset of the context data;

extract a correlation between the characterization information of the first physical object and the focus area of the user state; and generate, based on the correlation between the characterization information of the first physical object and the focus of the user state, a set of inferred questions for a question answering system.

20. The computer program product of claim 17, wherein the environment data includes weather data, crowd density, noise level, and temperature, and the biometric data includes heart rate, eye movement, gait, posture, and vocal data.

* * * * *